United States Patent
Zhou et al.

(10) Patent No.: US 9,106,716 B2
(45) Date of Patent: Aug. 11, 2015

(54) METHOD, APPARATUS, AND SYSTEM FOR CROSS-PLATFORM CONFERENCE CONVERGENCE

(71) Applicant: Huawei Technologies Co., Ltd., Shenzhen, Guangdong (CN)

(72) Inventors: Riming Zhou, Nanjing (CN); Guihua Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 301 days.

(21) Appl. No.: 13/705,987

(22) Filed: Dec. 5, 2012

(65) Prior Publication Data
US 2013/0094671 A1    Apr. 18, 2013

Related U.S. Application Data

(63) Continuation of application No. PCT/CN2011/073736, filed on May 6, 2011.

(30) Foreign Application Priority Data

Jun. 30, 2010    (CN) .......................... 2010 1 0218658

(51) Int. Cl.
| | |
|---|---|
| *H04M 3/42* | (2006.01) |
| *H04L 29/06* | (2006.01) |
| *H04L 12/18* | (2006.01) |
| *G06F 17/00* | (2006.01) |
| *H04W 4/00* | (2009.01) |

(52) U.S. Cl.
CPC .............. *H04L 65/403* (2013.01); *G06F 17/00* (2013.01); *H04L 12/1818* (2013.01); *H04L 65/103* (2013.01); *H04L 65/1026* (2013.01); *H04L 65/1046* (2013.01); *H04L 65/1063* (2013.01); *H04L 65/1069* (2013.01); *H04L 65/1093* (2013.01); *H04L 65/4038* (2013.01); *H04L 12/1822* (2013.01); *H04W 4/00* (2013.01)

(58) Field of Classification Search
CPC .................. H04M 3/56; H04M 3/567; H04M 2203/5009; H04L 65/403; H04L 65/1069
USPC ............................... 379/202.01; 370/260, 261
See application file for complete search history.

(56) References Cited

U.S. PATENT DOCUMENTS

| | | | |
|---|---|---|---|
| 7,003,086 B1 | 2/2006 | Shaffer et al. | |
| 2002/0078153 A1* | 6/2002 | Chung et al. | 709/204 |
| 2003/0145054 A1* | 7/2003 | Dyke | 709/205 |

FOREIGN PATENT DOCUMENTS

| | | |
|---|---|---|
| CN | 101047533 A | 10/2007 |
| CN | 101247564 A | 8/2008 |
| CN | 101291373 A | 10/2008 |

OTHER PUBLICATIONS

International Search Report in corresponding International Patent Application No. PCT/CN2011/073736 (Aug. 11, 2011).

(Continued)

*Primary Examiner* — Alexander Jamal
(74) *Attorney, Agent, or Firm* — Leydig, Voit & Mayer, Ltd.

(57) ABSTRACT

A method, an apparatus, and a system for cross-platform conference convergence are disclosed in embodiments of the present invention, where implementation of the method includes: receiving, after attending a first conference, an INVITE request sent by a first application server, where the INVITE request is a request for inviting a second terminal served by a second application server to attend a first conference; sending an invitation call to the second application server to request creating a second conference; and sending, after receiving conference creation success information sent by the second application server, an invitation to the second application server to invite the second terminal to attend the second conference. Usage of a private line between an enterprise and an operator can be eliminated in the entire implementation process.

14 Claims, 5 Drawing Sheets

(56) References Cited

OTHER PUBLICATIONS

Written Opinion of the International Searching Authority in corresponding International Patent Application No. PCT/CN2011/073736 (Aug. 11, 2011).

"TR 29.847—$3^{rd}$ Generation Partnership Project; Technical Specification Group Core Network; Conferencing Based on SIP, SDP and Other Protocols; Functional Models, Information Flows and Protocol Details (Release 6)," Jun. 2004, V6.0.0, 3GPP, Valbonne, France.

Extended European Search Report in corresponding European Patent Application No. 11800092.6 (Apr. 9, 2013).

* cited by examiner

METHOD, APPARATUS, AND SYSTEM FOR CROSS-PLATFORM CONFERENCE CONVERGENCE

CROSS-REFERENCE TO RELATED APPLICATIONS

This application is a continuation of International Patent Application No. PCT/CN2011/073736, filed on May 6, 2011, which claims priority to Chinese Patent Application No. 201010218658.1, filed on Jun. 30, 2010, both of which are hereby incorporated by reference in their entireties.

FIELD OF THE INVENTION

The present invention relates to the field of communications technologies, and in particular to a method, an apparatus, and a system for cross-platform conference convergence.

BACKGROUND OF THE INVENTION

Conference services exist in multiple topologies. Different topologies, that is, different networks, may be called a heterogeneous network to each other, such as a local area network inside an enterprise, and a telephony network on the side of an operator. Generally, an enterprise constructs a conference system in an Internet Protocol (IP) network environment of the enterprise. IP terminals of the enterprise, for example, personal computer (PC) terminals, may directly access a conference platform in an IP network of the enterprise. A conference system constructed by an operator, however, may provide conference services toward all network forms, allowing access of terminals in a circuit switched domain, such as mobile phones and fixed-line phones.

The demands for access to the conference system of the enterprise still exist, when an employee of the enterprise is out of the enterprise, for example, on a business trip. Usually, the employee of the enterprise accesses the conference system of the enterprise by means of a mobile phone, a fixed-line phone, and the like. Using this means requires that the enterprise lease a private line from the operator, so as to support access of terminals (mobile phones and fixed-line phones). When the enterprise initiates an outgoing call to the mobile phone or the fixed-line phone of the employee by leasing a private line from the operator, the conference system of the enterprise directly initiates a call to the mobile phone or the fixed-line phone of the employee, the call from the conference system of the enterprise to the mobile phone is routed to a circuit switched domain network of the operator by using the private line, and then the circuit switched domain network calls the mobile phone. When the employee actively attends a conference by using the mobile phone, the operator needs to configure a number for the private line of the enterprise. When the mobile phone calls the conference system of the enterprise, the circuit switched domain network routes the call of the mobile phone to the conference system by using the private line leased by the enterprise.

In the conventional art, however, access of each terminal requires a private line channel, resulting in high cost for maintaining private lines between the enterprise and the operator, thereby unfavorable to popularization. Furthermore, resources of private lines are wasted because diversified types of terminals require that a private line provides a function of routing to the networks of all operators.

SUMMARY OF THE INVENTION

The technical issue that needs to be addressed in embodiments of the present invention is to provide a method, an apparatus, and a system for cross-platform conference convergence, eliminating usage of a private line between an enterprise and an operator.

To address the technical issue, a method for cross-platform conference convergence, according to an embodiment of the present invention, may be implemented by using the following technical solution:

receiving, after attending a first conference, an INVITE request sent by a first application server, where the INVITE request is a request for inviting a second terminal served by a second application server to attend the first conference;

sending an invitation call to the second application server to request creating a second conference, where the invitation call carries parameters for receiving media that are negotiated with the first conference;

acquiring, after receiving conference creation success information sent by the second application server, transmission-related parameters negotiated, according to the parameters for receiving media that are negotiated with the first conference and carried in the invitation call, with a second media resource server on the side of the second application server; and sending an invitation to the second application server to invite the second terminal to attend the second conference.

A gateway includes:

a request receiving unit, configured to receive, after the gateway attends a first conference, an INVITE request sent by a first application server, where the INVITE request is a request for inviting a second terminal served by a second application server to attend the first conference;

an invitation sending unit, configured to send an invitation call to the second application server to request creating a second conference, where the invitation call carries parameters for receiving media that are negotiated with the first conference;

a success message receiving unit, configured to receive conference creation success information sent by the second application server;

a parameter acquiring unit, configured to acquire, after the conference creation success information sent by the second application server is received, transmission-related parameters negotiated, according to the parameters for receiving media that are negotiated with the first conference and carried in the invitation call, with a second media resource server on the side of the second application server; and an inviting unit, configured to send an invitation to the second application server to invite the second terminal to attend the second conference.

A system for cross-platform conference convergence includes two or more conference platforms on heterogeneous networks, and further includes the gateway according to any one of the embodiments of the present invention.

The technical solutions yield the following favorable results: A gateway device, serving as a medium of heterogeneous networks, creates a second conference, and implements, by using transmission-related parameters of the second conference that are negotiated according to parameters for receiving media of a first conference, conference cascading between two different conference platforms, thereby implementing convergence of heterogeneous networks through conference cascading. The objective of a conference across multiple conference platforms is achieved. Usage of a private line between the enterprise and the operator is eliminated in the entire implementation process. In addition, it is favorable to popularization because only a gateway device is added between heterogeneous networks, and original devices of the operator and the enterprise are reserved, changing the networks slightly.

BRIEF DESCRIPTION OF THE DRAWINGS

To illustrate the technical solutions in the embodiments of the present invention more clearly, the following briefly describes the accompanying drawings required for describing the embodiments. Apparently, the accompanying drawings in the following description merely show some embodiments of the present invention, and persons of ordinary skill in the art can derive other drawings from the accompanying drawings without creative efforts.

FIG. 1 is a schematic flow chart of a method according to a first embodiment of the present invention;

FIG. 2 is a schematic structural diagram of a system according to a second embodiment of the present invention;

FIG. 3 is a schematic flow chart of a method according to the second embodiment of the present invention;

FIG. 4 is a schematic structural diagram of an audio mixing system of a gateway according to the second embodiment of the present invention;

FIG. 5 is a schematic structural diagram of an audio mixing system of an MRS according to the second embodiment of the present invention;

FIG. 6 is a schematic structural diagram of a gateway according to a third embodiment of the present invention;

FIG. 7 is a schematic structural diagram of a gateway according to the third embodiment of the present invention;

FIG. 8 is a schematic structural diagram of a gateway according to the third embodiment of the present invention;

FIG. 9 is a schematic structural diagram of a gateway according to the third embodiment of the present invention;

FIG. 10 is a schematic structural diagram of a gateway according to the third embodiment of the present invention; and FIG. 11 is a schematic structural diagram of a system according to a fourth embodiment of the present invention.

DETAILED DESCRIPTION OF THE EMBODIMENTS

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
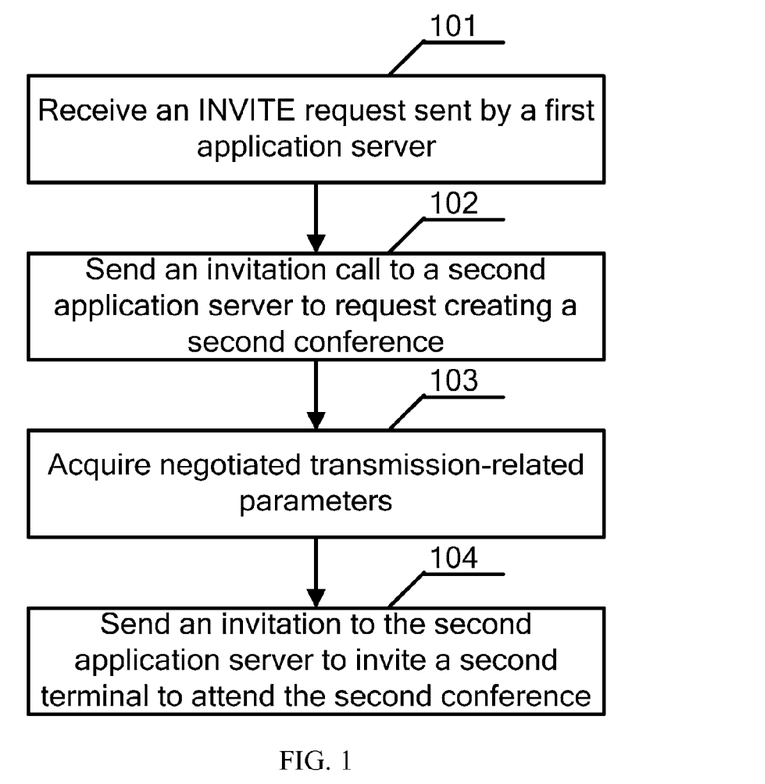

As shown in FIG. 1, this embodiment of the present invention provides a method for cross-platform conference convergence, including:

101: Receive an INVITE request sent by a first application server, where the INVITE request is a request for inviting a second terminal served by a second application server to attend a first conference.

Specifically, after a gateway device attends the first conference, the gateway device receives the INVITE (INVITE) request for inviting the second terminal to attend the first conference created by the first application server, where the INVITE message is sent by the first application server and may carry identifiers of one or more second terminals. Parameters in the INVITE request may be carried by using a format specified in the Session Description Protocol (Session Description Protocol, SDP). In this step, the gateway device serves as a device between a first network and a second network. A home network of the second terminal is learnt according to the identifier (such as, a mobile phone number, or a network address) of the second terminal in the INVITE request. A home network of the first application server is learnt according to transmission parameters in the received INVITE request, for example, a sending address of a port. Then, it can be learnt that the INVITE request is a request for inviting, by an application server on the first network, a terminal on the second network to attend the first conference. The first conference is a conference created by the first application server on the first network. In addition, the gateway determines, according to the identifier of the second terminal in the INVITE request, an application server on the second network, that is, the second application server, which serves the second terminal.

SDP indicates a format that describes initial parameters of streaming media and transmits information about a media stream in a media session. SDP may include one or more pieces of the following information: 1) a session name and an objective; 2) session alive time; 3) media information included in a session, such as a media type, a transport protocol, a media format, and a multicast or remote-end (unicast) address and a port; 4) information necessary for receiving media; 5) information about bandwidth in-use; 6) trustworthy contact information; and the like.

It should be noted that the first and the second are used to distinguish devices on two different conference platforms (or heterogeneous networks), but do not imply other special meanings and should not be construed as limitations to embodiments of the present invention. This will not be described in subsequent embodiments again.

102: Send an invitation call to the second application server to request creating a second conference, where the invitation call carries parameters for receiving media that are negotiated with the first conference.

Specifically, the second application server on the home network of the second terminal is acquired according to the identifier of the second terminal in the INVITE request, and the invitation call for creating the second conference is sent to the second application server to request creating the second conference.

The invitation call may carry the parameters for receiving media (where the parameters for receiving media may be an intersection between parameters for receiving media of the gateway device and parameters for receiving media of the first conference) that are negotiated by the gateway device with the first conference. As a member of the first conference, after attending the first conference, the gateway device already obtains through negotiation the parameters for receiving media that are negotiated by the gateway device with the first conference.

In this step, as a conference initiation device on the second network, the gateway device requests the second application server on the second network to create the second conference, to which this embodiment does not set limitations.

103: After conference creation success information sent by the second application server is received, acquire transmission-related parameters that are negotiated, according to the parameters for receiving media that are negotiated with the first conference and are carried in the invitation call, with a second media resource server on the side of the second application server.

The media resource server (Media Resource Server, MRS) may acquire results about the negotiated transmission-related parameters according to an intersection between the "parameters for receiving media that are negotiated by the gateway device with the first conference" and carried in the invitation call and parameters of a self-supported receiving media, where the results about the negotiated transmission-related parameters are specifically the transmission-related parameters. In this embodiment, a media stream provided by the MRS may be an audio media stream or a video media stream, to which this embodiment does not set limitations. Media transmission-related parameters may include: media information in a session, such as the media type, the transport protocol, the media format, and the multicast or remote-end (unicast) address and port; the bandwidth in-use, an audio mixing device specified in the transmission process, and the like, where the media transmission-related parameters are specifically the transmission-related parameters.

104: Send an invitation to the second application server to invite the second terminal to attend the second conference.

After negotiation of the transmission-related parameters in 103 is complete, media streams may be transmitted according to the transmission-related parameters. After the negotiation of transmission-related parameters is complete, a participation success response may be sent to the first application server.

After the second terminal attends the second conference, if a first media stream sent by the first application server is received, the gateway device may forward the first media stream to the second media resource server; and if a second media stream sent by the second application server is received, the gateway device may forward the second media stream to a first media resource server. Specifically, a protocol that is used to forward the first media stream to the second media resource server and forward the second media stream to the first media resource server is the Session Initiation Protocol (Session Initial Protocol, SIP). As the SIP specification specifies how to negotiate a media address of a conference, it may be directly observed. Certainly, another protocol may also be used, such as the Simple Object Access Protocol (Simple Object Access Protocol, SOAP) or the Transmission Control Protocol (Transmission Control Protocol, TCP), only a private interface needs to be defined to support negotiation of the media address of the conference when another protocol is used.

More specifically, as SOAP supports interactions across hardware platforms and across operating systems, it is applicable to an integrated interface between two independent systems. A SOAP control interface may be used. In addition, an SIP interface is recommended, and the RFC3261 and RFC3515 standards may be observed.

An execution body of the method or means in this embodiment may be the gateway device. The gateway device, serving as a medium of heterogeneous networks, creates a conference, negotiates communication parameters, and implements conference cascading between two different conference platforms, thereby implementing convergence of heterogeneous networks through conference cascading. The objective of a conference across multiple conference platforms is achieved. Usage of a private line between an enterprise and operator is eliminated in the entire implementation process. In addition, it is favorable to popularization because only a gateway device is added between heterogeneous networks, and original devices of the operator and the enterprise are reserved, changing the networks slightly.

Embodiment 2

This embodiment will take a living example to further describe a method for cross-platform conference convergence according to the embodiment of the present invention. In this embodiment, heterogeneous networks are a second network, for example, a network on the side of an operator, and a first network, for example, a local area network inside an enterprise, where a terminal served by the second network is a mobile phone, or a fixed-line phone (Phone), a terminal served by the first network is a personal computer, a gateway is an Internet gateway (Inter-Gateway), a conference is a voice conference (this information may be specified in an INVITE message by an invitation sending device according to SDP). It should be understood that the example is only one of many living examples, and therefore, the example should not be construed as a limitation to this embodiment.

When an application server on the first network, that is, a first application server, requires that a user of a mobile phone attend a first conference, the first application server (Application Server, AS) will route, after the first application server invites the Inter-Gateway to attend the first conference, an INVITE request for inviting the mobile phone to attend the first conference to the Inter-Gateway. The Inter-Gateway initiates an invitation call for conference creation to a second AS. The Inter-Gateway, serving as a user of a second conference, creates and attends an operator conference. For a conference system on the side of the enterprise, the Inter-Gateway may, serving as a virtual mobile phone, attend a conference on the side of the enterprise. There is a conference taking place in the conference system on the side of the enterprise and in a conference system of the operator respectively. Between the two conferences, multi-party mixed voices of the two conferences may be transmitted over a Real-time Transport Protocol (Real-time Transport Protocol, RTP) channel.

The Inter-Gateway initiates, over a control interface, an invitation call to an AS on the side of the operator for inviting the user of the mobile phone, where the invitation call message may carry one or more numbers of mobile phones for inviting the mobile phone to attend the operator conference. The AS on the side of the operator parses the request, initiates a call to the mobile phone with the mobile phone number to invite it to attend the conference, and returns, after the invitation succeeds, an invitation result to the Inter-Gateway over the control interface.

Figure 2:
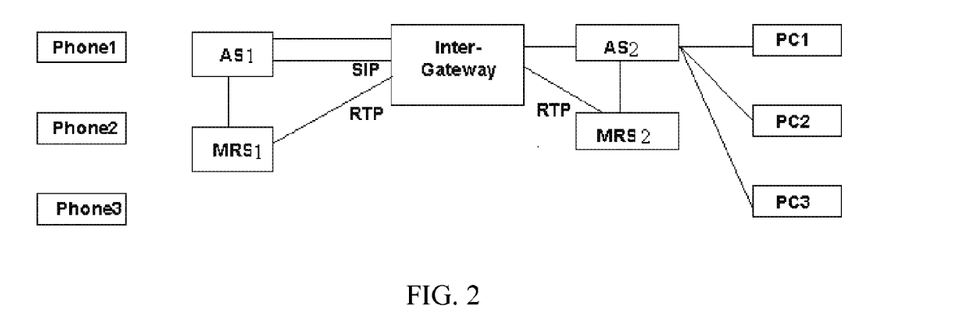
Figure 3:
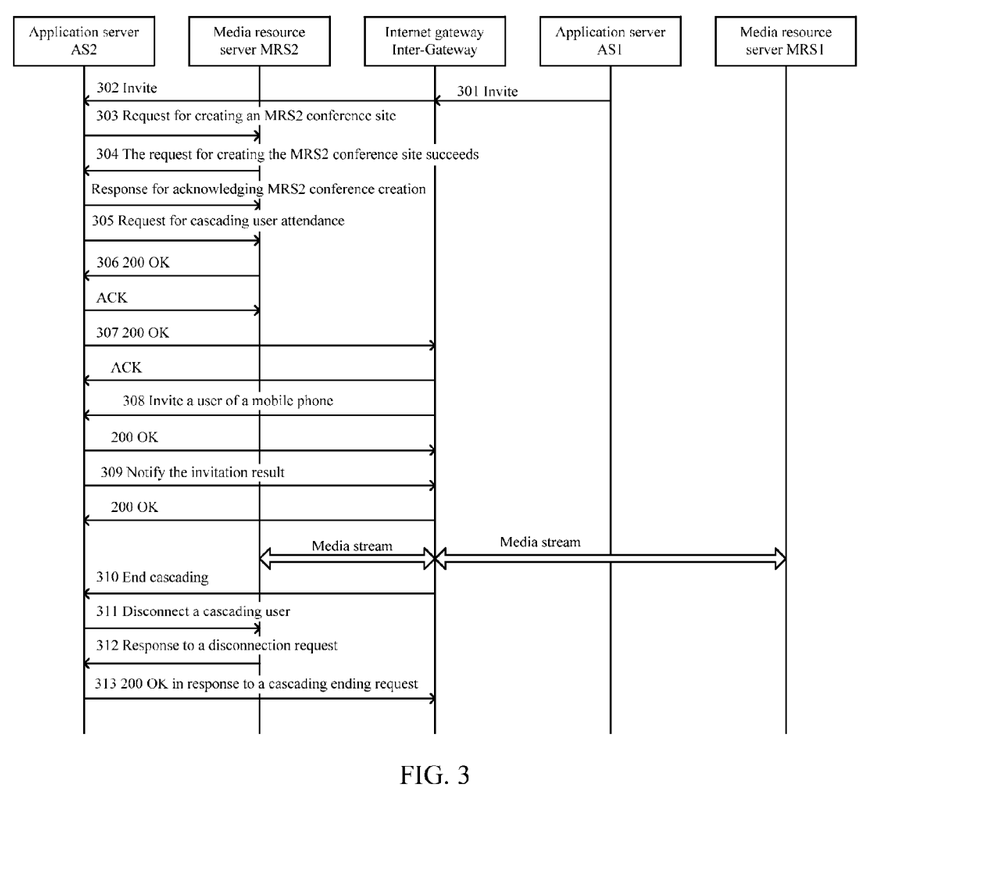

The following will take a specific procedure for description. Please refer to FIG. 2 and FIG. 3. FIG. 2 is a schematic structural diagram of a topology, where the Inter-Gateway, serving as a device on the edge of a heterogeneous network, connects two heterogeneous networks. In FIG. 2, the part on the left of the gateway is an operator network including AS2, MRS2, and Phones 1-3; and the part on the right is a local area network including AS1, MRS1, and PCs 1-3. FIG. 3 is a schematic flow chart of a method, and the specific procedure is as follows:

301: The Inter-Gateway receives an INVITE request for inviting it to attend the first conference, where the INVITE request is sent by an application server (AS1) on the side of the enterprise and carries identifiers of one or more terminals. The SDP protocol may be used for the INVITE request, and its port is an Internet Protocol (Internet Protocol, IP) port. After receiving the INVITE request message sent by the AS1, the Inter-Gateway may first send a message in response to the invitation to attend the first conference, where reference may be made to the procedure that a PC attends a local area network conference: The response to the invitation carrying SDP information of the Inter-Gateway is sent to the AS1, the AS1 sends a user participation request carrying the SDP information of the Inter-Gateway to the MRS1, and the MRS1 negotiates transmission-related parameters according to the SDP information of the Inter-Gateway and then returns the transmission-related parameters, for example, address of the MRS1, to the AS1; and the AS1 returns an acknowledgment response for acknowledging the invitation to the Inter-Gateway and sends the negotiated transmission-related parameters to the Inter-Gateway, in addition, the AS1 may return the acknowledgment response of the "returning transmission-related parameters, for example, the address of the MRS1" to acknowledge that the message has already been received.

In the procedure that the gateway attends the first conference, command parameters that may be used are as shown in Table 1.

TABLE 1

| SIP head | Cat | Description | Parameter | Comment |
|---|---|---|---|---|
| Request-URI | M | Signaling destination URI | None | HW-AS conference number URI. For example: sip:conf000231@test.com |
| From | M | Signaling initiator URI | None | URI of the initiator. Fill in sip: linkconf00001@test.com, where a linkconf identifier indicates an identifier of a cascaded conference, and 00001 indicates the conference number. |
| To | M | Signaling recipient URI | None | HW-AS conference number URI. Same as the Request-URI. |
| Subject | M | Abstract | None | Subject of a session drafted by a user, which may be left blank. |
| supported | C | Expansion supported by a signaling sender | None | timer: indicates the support for a session timer mechanism. If no expansion is supported, this header may be left blank. |
| Session-Expires | C | Expected refresh period of a session timer | refresher: a party for refreshing a session actively, which may be set to uac or ucs | Unit: second |
| Min-SE | C | Allowable shortest refresh period of a session timer | None | Unit: second |
| Require | M | Capability that a signaling initiator wants a recipient to have for processing a request | None | timer: indicates the support for the session timer mechanism. If no expansion is supported, this header may be left blank. |
| User-Agent | M | UAC information | None | Filled in by a CW-MGW. It is set to Conf-serv/3GPP. |
| Server | M | UAS information | None | Filled in by a HW-AS. It is set to Conf-serv/3GPP. |
| Contact | M | | None | Filled in by a HW-AS. Conference URI. |
| Cotent-type | M | Message body type | Boundary(content-type = multipart/mixed: mandatory): a separator between each part in a message body | If a message body includes a name list of initial session members and SDP, it is multipart/mixed. If the message body includes only SDP, it is application/sdp. |
| Cotent-length | M | Message body length | None | Message body length |
| Message body | M | None | None | Audio cascading, including audio SDP. Video cascading, including audio and video SDP. |

| Sdp Line | Cat | | Comment |
|---|---|---|---|
| v line | M | Version | The value is invariably 0. |
| o line | M | Source | <username>: The value is determined by the MGCF. <session id>: globally unique value. |

TABLE 1-continued

| | | | |
|---|---|---|---|
| | | | <version>: globally unique value, which increases depending on the signaling version.<br><network type>: The value is "IN".<br><address type>: The value is "IP4" or "IP6", which is determined by a bearer network.<br><address>: IP address. |
| s line | M | Session name | The value is determined by the MGCF. |
| Session c line | M | Session connection information | <network type>: The value is "IN", indicating the Internet.<br><address type>: The value is "IP4" or "IP6", which is determined by the bearer network.<br><address>: IP address. |
| t line | M | Session activation time | Value: "0 0". |
| m line | M | | <media>: audio.<br><port>UE: audio port of a terminal. AS: audio port of an MRS.<br><transport>: It is set to RTP/AVP.<br><fmt list>: The value may be 0, 8, or a dynamic value. |
| a = rtpmap line | M | | Detailed description of encoding formats:<br>rtpmap: 0 PCMU/8000 or<br>rtpmap: 8 PCMA/8000 or<br>tpmap: <dynamic-PT> PCMU/8000 or<br>rtpmap: <dynamic-PT> PCMA/8000 |
| Media stream direction | M | | None |
| m line | M | | <media>: video.<br><port>AS: video port applied for from an MRS.<br>UE: video port of a terminal.<br><transport>: transport protocol whose value is RTP/AVP<br><fmt list><br>AS: encoding format that an MRS may support.<br>UE: encoding format that a terminal may support. |
| a = rtpmap line | M | | Detailed information about the encoding format. |
| Media c line | O | Connection information of a specified media | AS: For a distributed server, different ip addresses may be used for different services, but only one ip address can be specified for session c line. Therefore, if the address used by a certain medium is different from the connection information in session c line, media c line is used. |

Error codes in the conference procedure are shown in Table 2:

TABLE 2

| Error Code | Description Comment | | Sip Header |
|---|---|---|---|
| 200 | Success | | SIP |
| 401 | Incorrect password. | | SIP |
| 404 | A user-specified conference does not exist. | | SIP |
| 486 | The number of conference members reaches the upper limit. (Do not appear during conference cascading.) | | SIP |
| 432 | Incorrect password. | | dconf |
| 433 | The conference is pending. | | dconf |
| 434 | The conference site is locked. (Do not appear during conference cascading.) | | dconf |

The following gives a message example by using the preceding command parameters.

Note: The message example according to the embodiment of the present invention is only taken as a format reference, and should not be construed as a limitation to the present invention.

Example of an INVITE message:
INVITE sip:conference-factory1@home1.net SIP/2.0
Max-Forwards: 70
P-Preferred-Identity: "John Doe" <sip:user1_public1@home1.net>
From:<sip:user1_public1@home1.net>; tag=171828
To: <sip:conference-factory1@ home1.net>
Subject: "conference topic"
Server: Conf-serv/3GPP
Call-ID: cb03a0s09a2sdfglkj490333
Cseq: 127 INVITE
Supported: timer
Session-Expires: 4000
Min-SE: 3600
Allow: INVITE, ACK, CANCEL, BYE, PRACK, UPDATE, REFER, MESSAGE, SUBSCRIBE, NOTIFY
Content-Type: application/sdp -continued

```
Content-Length: (. . .)
v=0
o=- 2987933615 2987933615 IN IP4 10.70.139.111
s=-
c=IN IP4 10.70.139.111
t=0 0
m=audio 10002 RTP/AVP 0
a=rtpmap:0 pcmu/8000
m=video 13578 RTP/AVP 31
c=IN IP4 10.71.139.111
Example of a response message:
SIP/2.0 200 OK
P-Asserted-Identity: <sip:mrfc1.home1.net>
From: <sip:user1_public1@home1.net>; tag=171828
To: <sip:conference-factory1@.home1.net>;tag=314159
Call-ID: cb03a0s09a2sdfglkj490333
CSeq: 127 INVITE
Contact: <conf000001@.home2.net >;isfocus
Server:Conf-serv/3GPP
Require: timer
Supported: timer
Session-Expires: 4000;refresher=uac
Content-Type: application/sdp
Content-Length: (. . .)
v=0
o=- 2987933615 2987933615 IN IP4 10.70.139.111
s=-
c=IN IP4 10.70.139.121
t=0 0
m=audio 2046 RTP/AVP 0
a=rtpmap:0 pcmu/8000
m=video 13578 RTP/AVP 31
c=IN IP4 10.71.139.111
```

302: After receiving the INVITE request message sent by the AS1, the Inter-Gateway determines, according to the identifiers of one or more terminals carried in the INVITE request, for example, one or more mobile phone numbers, a second application server on the home network of the one or more terminals, and sends an SIP INVITE (INVITE) call to the second application server AS2 to request creating a conference (MRS2 conference site request).

The SIP INVITE may carry the negotiated transmission-related parameters in 301, such as a media address, a port, encoding and decoding information, where the specific carrying manner may be that they are carried by SDP in the SIP INVITE. In the Inter-Gateway, one or more application servers corresponding to each of the networks are configured, and therefore, a network corresponding to the one or more terminals may be determined according to the carried identifiers of one or more terminals in the step 301, so that the second application server on the home network of the one or more terminals is obtained according to the determined network.

In addition, the Inter-Gateway may further allow the second application server to learn that the SIP INVITE is an invitation originating from a heterogeneous network, for example, the from header field (or the P-Assert-Identity header field) of the SIP INVITE may be filled in with the terminal identifier of a conference creator of the first conference, the AS2 may distinguish, by preconfiguring the format of a calling number, that the SIP INVITE call is initiated by a conference device of another network, and in this way, the AS2 may learn that a conference creation request sent to the AS2 is a cascading request, that is, a request for cascading the conference that the AS2 attends with the conference that the AS1 attends. For example, a number of a mobile phone is a mobile phone number, a terminal on the side of the enterprise is an IP address, and the AS2 obtains, according to the IP address in the SIP INVITE, that the SIP INVITE is initiated by the conference device on the side of the enterprise.

303: After parsing that the SIP INVITE call is a conference creation call, the AS2 sends a conference creation request to an MRS2, and specifically may send an MRS2 conference site creation request.

304: After a media conference is successfully created, the second media resource server (Media Resource Server, MRS2) returns a message indicating that the request for creating the MRS2 conference succeeds (200 OK) to the application server AS2 on the side of the operator. The AS2 may return a response for acknowledging creation of the MRS2 conference site (ACK) to the MRS2, acknowledging that the AS2 learns successful creation of the MRS2 conference site.

305: The AS2 sends a message for requesting cascading user attendance to the MRS2, where the message for requesting the cascading user attendance is used to request the MRS2 to provide a media service for the conference site, and may use the SDP to carry the negotiated transmission-related parameters in 301, for example, transmission-related parameters such as the media address, the port, and the encoding and decoding information.

306: The MRS2 determines, according to SDP information in the message for requesting the cascading user attendance and media transmission parameters supported by the MRS2, transmission-related parameters to be used in the second conference. After negotiation of transmission-related parameters is complete, the MRS2 may return a 200 OK response to the application server on the side of the operator to notify the AS2 that the transmission-related parameters are successfully negotiated and further notify the AS2 of the negotiated transmission-related parameters. After receiving the 200 OK response, the application server on the side of the operator returns an ACK (ACK) message to the media resource server on the side of the operator, so as to acknowledge the receipt of the message that the transmission-related parameters are successfully negotiated, and the AS2 may learn, from the message that the transmission-related parameters are successfully negotiated, that the negotiation of conference transmission is complete and media streams can be transmitted.

307: After receiving the 200 OK response carrying the negotiated transmission-related parameters, the AS2 returns the 200 OK response to the Inter-Gateway, where, in the 200 OK, SDP is used to carry the negotiated transmission-related parameters to the Inter-Gateway. In addition, there may be multiple conferences on the side of the AS2, and the AS2 may further send the conference number of the second conference to the Inter-Gateway. After receiving the transmission-related parameters, the Inter-Gateway may send an ACK to the AS2 to acknowledge receipt of the transmission-related parameters. In this case, the Inter-Gateway successfully initiates and creates the conference on the side of the operator in the conference system on the side of the operator, and may perform transmission of media streams according to the learnt transmission-related parameters, that is, a media channel between it and the MRS2 is established (after negotiation, for the MRS2, the MRS2 learns an IP and a port of the Inter-Gateway, and for the Inter-Gateway, the Inter-Gateway learns an IP and a port of the MRS2. Both of them may send or receive media streams in the IP and the port learnt by each of them, that is, the media channel is established). Connection of two conferences is implemented as the Inter-Gateway, serving as a device on the edge of a network, connects the conference on the side of the enterprise and the conference on the side of the operator.

In addition, the request field of a uniform recourse identifier (Request Uniform Resource Identifier, Request-URI) in the 200 OK response sent by the AS2 to the Inter-Gateway also carries the conference number of the second conference.

As there may be multiple conferences on the side of the AS2, a conference control interface of the Inter-Gateway may use the conference number of the second conference to determine the second conference to which the Inter-Gateway belongs.

308: The Inter-Gateway initiates, over the control interface, a request (REFER) for inviting the user of the mobile phone to attend the second conference to the AS2, where the request may carry the number of the conference that the user of the mobile phone are invited to attend, and the request for inviting the user of the mobile phone to attend the second conference may carry the mobile phone number and an indication of attendance invitation. In the same way, a request for removing the user of the mobile phone may also be sent, where the request for removing the user of the mobile phone may also carry the mobile phone number and an indication of removal. In the process of removal, the AS1 receives a removal request sent by a conference manager on the side of the enterprise (it may be a terminal on the side of the enterprise that has permission to manage a conference site), and the AS1 judges that a removal object carried in the removal request is a device on the heterogeneous network and forwards the removal request to the gateway device. The gateway device finds, according to mobile phone number carried in the removal request, that the mobile phone number is in the second conference, and sends the removal request carrying the mobile phone number to the AS2 to request the AS2 to remove the mobile phone with the mobile phone number. The SIP REFER method may be used for the request for inviting the user of the mobile phone and the request for removing the user of the mobile phone. In this way, RFC3515 may be observed. Certainly, an SOAP interface may also be used. If the SOAP interface is used, an interface may be customized during implementation.

This embodiment of the present invention also provides definitions of control interfaces between the Inter-Gateway and the AS2. The conference control interface is a bidirectional interface and completes control and status notification between two conference systems. Protocols such as TCP and SOAP may be used. Primary control and event examples are shown in Table 3.

TABLE 3

SOAP control interfaces between the Inter-Gateway and the AS2

| Interface | Command or Event | Description |
|---|---|---|
| InviteUser | Command | From an Inter-Gateway to an AS. Request the AS to invite a mobile phone or fixed-line phone number. Carried parameters: conference number and user number. |
| SetSilient | Command | Set a conference to mute or a user to mute. Carried parameters: conference number, user number, and setting or removal identifier. |
| KickOffUser | Command | A mobile station integrated services digital network number (mobile station integrated services digital network number, MSISDN) that receives a short message. |
| EventNotify | Event | An AS notifies an Inter-Gateway. Report the state of a conference site or a member. Carried parameters: conference number, user number, and state information. |

309: The AS2 parses the request for inviting the user of the mobile phone, calls the user of the mobile phone, and adds the user of the mobile phone to the second conference (adding it to the MRS2). After it is successfully added, a processing result notification is sent to the Inter-Gateway, and a specific message may be an invitation result notification (NOTIFY). After receiving the message of the processing result notification, the Inter-Gateway may return a 200 OK message to the AS2. The Inter-Gateway may further receive a second conference site control command sent by the first application server, where the second conference site control command carries a conference site control instruction. The Inter-Gateway may send, according to the conference site control instruction, a message carrying the conference site control instruction to the second application server to request the second application server to control the second conference site according to the conference site control instruction. The conference site control instruction may be an operation, such as, removing a member, muting a terminal, muting a conference site, and locking a conference site. The conference site control instruction may be transmitted to the AS2 over the conference control interface. Similarly, if the AS2 has a request or state change event, the event is sent to the Inter-Gateway over the conference control interface. It is recommended to use the SIP NOTIFY method, and RFC3515 may be observed. If an SOAP interface is used, it is may be customized during implementation.

After the user of the mobile phone is added to the operator conference, a media stream transmission starts.

The media stream transmission may be as follows: The MES2 receives a media stream sent by the mobile phone, and then forwards the media stream to the Inter-Gateway, and the Inter-Gateway then forwards the media stream to the media resource server MRS1 on the side of the enterprise. It may also be as follows: After receiving the media stream sent by a terminal on the side of the enterprise, the MRS1 sends the media stream sent by the terminal on the side of the enterprise to the Inter-Gateway, the Inter-Gateway sends the media stream sent by the terminal on the side of the enterprise to the MRS2, and the MRS2 then sends the media stream sent by the terminal on the side of the enterprise to a mobile phone in the conference on the side of the operator. In the process of media stream transmission, if two or more media streams are received by the MRS2, the Inter-Gateway and the MRS1, the MRS2, the Inter-Gateway, and the MRS1 may perform audio mixing processing, where the audio mixing processing is required when the terminal or the mobile phone on the side of the enterprise receives two or more media streams. The subsequent embodiment will describe this with an example.

310: Cascading ends after the conference on the side of the enterprise ends. The Inter-Gateway sends a SIP BYE message for ending the conference to the AS2 to request ending the second conference.

311: The AS2 sends the SIP BYE request message for disconnecting the second conference to the MRS2, thereby disconnecting cascading users and ending the conference on the side of the operator.

Command parameters in the end procedure are shown in Table 4.

TABLE 4

| SIP head | Cat | Description | Parameter | Comment |
|---|---|---|---|---|
| Request-URI | M | Signaling destination URI | None | UE: conference URI |
| From | M | Signaling initiator URI | None | Have the same value as the From header field in an INVITE request for a SIP dialog to be ended has. |
| To | M | Signaling recipient | None | Have the same value as the To header field in an INVITE |

TABLE 4-continued

| SIP head | Cat | Description | Parameter | Comment |
|---|---|---|---|---|
|  |  | URI |  | request for a SIP dialog to be ended has. |
| Call-ID | M | None | None | Have the same value as the Call-ID header field in an INVITE request for a SIP dialog to be ended has. |
| User-Agent | M | UAC information | None | UE: set to Conf-serv/3GPP. |
| Server | M | UAS information | None | AS: set to Conf-serv/3GPP. |

Error codes in an ending process of the conference are shown in Table 5.

TABLE 5

| Error Code | Description | Comment | Sip Header |
|---|---|---|---|
| 200 | Success |  | SIP |
| 408 | Request timed out |  | SIP |

Example of a BYE request message:
BYE sip:conference1@mrfc1.home1.net SIP/2.0
Max-Forwards: 70
From: <sip:user1_public1@home1.net>; tag=171828
To: <sip:conference-factory1@mrfc1.home1.net>; tag=314159
Call-ID: cb03a0s09a2sdfglkj490333
Cseq: 153 BYE
User-Agent: Conf-serv/3GPP
Content-Length: 0
Example of a returned result message:
SIP/2.0 200 OK
From: <sip:user1_public1@home1.net>; tag=171828
To: <sip:conference-factory1@mrfc1.home1.net>; tag=314159
Call-ID: cb03a0s09a2sdfglkj490333
Cseq: 153 BYE
Server:Conf-serv/3GPP
Content-Length: 0

312: The MRS2 ends the conference on the side of the operator, and sends a 200 OK in response to a disconnection request to the AS2.

313: After ending the conference on the side of the operator, the AS2 sends a 200 OK in response to a cascading ending request to the Inter-Gateway. Now, the conference on the side of the operator ends. The AS2 may further initiate a suspend procedure to each mobile phone terminal (which is omitted in FIG. 3).

Corresponding to inviting, by the user on the side of the enterprise, the user of the mobile phone on the side of the operator to attend the conference on the side of the enterprise, if a user of a mobile phone wants to invite a member on the side of the enterprise to attend a conference on the side of the operator, the mobile phone sends an invitation for inviting the member on the side of the enterprise to attend the conference on the side of the operator to the AS1, then the AS1 sends a SIP REFER message or a custom SOAP message to the Inter-Gateway to invite the member on the side of the enterprise to attend the conference on the side of the operator. Then, the Inter-Gateway negotiates transmission-related information with the network on the side of the enterprise and may attend the conference on the side of the enterprise.

Figure 4:
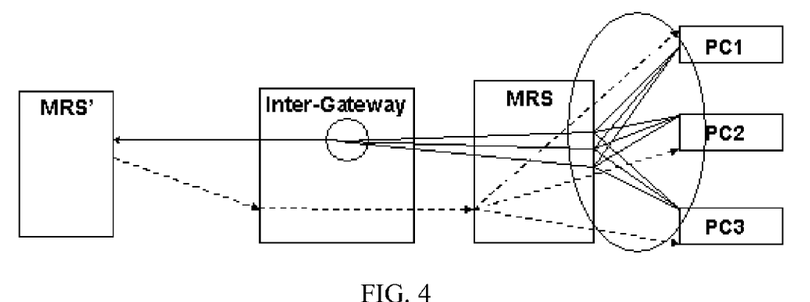

The following describes the audio mixing process of the Inter-Gateway. It should be noted that this function is not mandatory and the audio mixing function is implemented only when a conference MRS on one side does not support server audio mixing. The Inter-Gateway performs audio mixing for audio streams that are sent by all terminals of the conference on this side to the MRS, and outputs one audio media stream to the MRS on the other side. FIG. 4 is a networking schematic diagram.

Assume that the MRS in FIG. 4 does not support server audio mixing and the MRS' supports server audio mixing, media streams of terminals PC1, PC2, and PC3 are forwarded by the MRS, and finally each of the PCs performs audio mixing for received media streams. In this embodiment of the present invention, there is conference cascading and concurrently there are two media resource servers. An Inter-Gateway added in this embodiment of the present invention may perform audio mixing for at least two voice streams received, and then output one voice stream to the MRS'. The reverse process is as the part shown in FIG. 4 in dashed lines: A voice stream that comes from the MRS' and has already been performed audio mixing processing is sent to the MRS through the Inter-Gateway, and the MRS sends each voice stream to each terminal.

Figure 5:
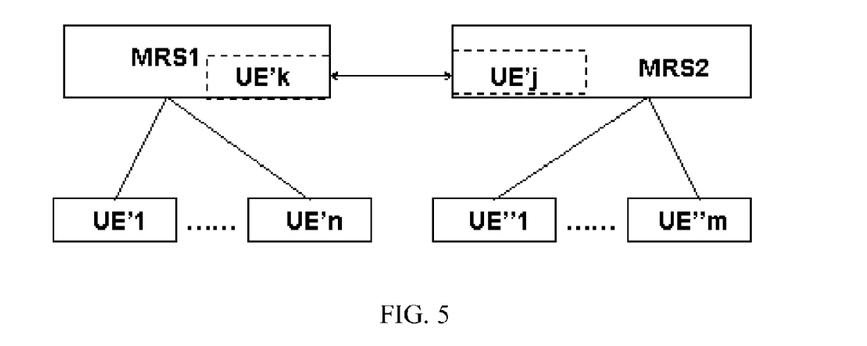

If the MRS has the audio mixing function, audio mixing may be performed by the MRS. As the scenario shown in FIG. 5, there are two audio mixing conference sites at the media layer, the MRS2 performs audio mixing for UE'1 to UE'n and a cascading user UE'k, and the MRS1 performs audio mixing for UE"1 to UE"m and a cascading user UE"j. These two audio mixing conference sites unify the two conference sites in a cascading mode. Specifically, the MRS2 accepts access of UE'1 to UE'n, and meanwhile a special UE (UE'j) which is a special terminal on the MRS1. The MRS2 performs audio mixing for voices of the UE'1 to the UE'n and sends the voices to the UE'j. As a user of the MRS1, the UE'j joins in the audio mixing in the MRS1 conference site with the UE"1 to the UE"m. Therefore, the UE"1 to the UE"m can not only hear voices of the UE"1 to the UE"m, but also hear voices of the UE'1 to the UE'n. Similarly, the UE'1 to the UE'n can not only hear voices of the UE'1 to the UE'n, but also hear voices of the UE"1 to the UE"m.

The Inter-Gateway, serving as a medium of heterogeneous networks, creates conferences, negotiates communication parameters, and implements cascading of voice conferences between two different conference platforms, thereby implementing convergence of heterogeneous networks through conference cascading. The objective of a conference across multiple conference platforms is achieved. Usage of a private line between the enterprise and the operator is eliminated in the entire implementation process. In addition, it is favorable to popularization because only a gateway device is added between heterogeneous networks, and original devices of the operator and the enterprise are reserved, changing the networks slightly.

In addition, after the second conference is created, the terminal on the side of the operator may attend the second conference by referring to a method for attending a common conference. Specifically, the terminal on the side of the operator sends a request for attending the conference to the AS2, thereby attending the second conference. In addition, after accepting a new conference member, the AS2 may send a message to the Inter-Gateway to notify information about the member newly attending the second conference (for example, notify the mobile phone number newly attending the second conference), and the Inter-Gateway may forward the information about the member newly attending the second conference to the AS1.

The AS2 may monitor whether a terminal attending the conference exits the conference. The specific monitoring manner may be as follows: The terminal periodically sends an UPDATE (UPDATE) message to the AS. Then, after receiving the UPDATE, the AS2 sends a response message to the terminal. If the AS2 does not receive the update message sent by the terminal within a set time threshold, it may be judged that the terminal exists abnormally. If a mobile phone exits abnormally in this embodiment, the AS2 sends the number of the mobile phone that exits abnormally to the gateway device, and then the gateway device may further send the number of the mobile phone that exits to the AS1, so as to notify that the mobile phone with the mobile phone number exits the conference. If all mobile phones attending the second conference exit the second conference in the duration of the second conference, the second conference may still exist. The second conference may also be ended by the AS2, and a message indicating that the second conference ends is sent to the gateway. The gateway sends the message indicating that the second conference ends to the AS1.

Key fields in messages in the monitoring procedure are shown in Table 6.

TABLE 6

| SIP head | Cat | Description | Parameter | Comment |
|---|---|---|---|---|
| Request-URI | M | Signaling destination URI | None | Filled in by a CW-MGW. HW conference URI |
| From | M | Signaling initiator URI | None | Filled in by a CW-MGW. CW cascading conference URI |
| To | M | Signaling recipient URI | None | HW conference URI |
| Server | M | UAS information | None | Filled in by a HW-AS, and set to Conf-serv/3GPP |
| User-Agent | M | UAC information | None | Filled in by a CW-MGW, and set to Conf-serv/3GPP |
| session-expires | M | Expected refresh period of a session timer | Refresher (O): a party for refreshing a session actively, which may be set to uac or ucs | Filled in by a CW-MGW. Unit: second. In this system, the refresher must be uac. |
| Content-Length | M | Message length | None | 0 |

Example of an UPDATE message:
UPDATE sip:conf0000001@ home1.net SIP/2.0
From:<sip:user1_public1@home1.net>;tag=212868d4
To:<sip:conf0000001@ home1.net >;tag=7b5a8365
Cseq:2 UPDATE
Call-ID: cb03a0s09a2sdfglkj490333
User-Agent: Conf-serv/3GPP
Supported:timer
Max-Forwards:70
Session-Expires:240;refresher=uac
Content-Length:0
Example of a response message:
SIP/2.0 200 OK
From: <sip:user1_public1@home1.net>; tag=171828
To: :<sip:conf0000001@ home1.net >;tag=7b5a8365
Call-ID: cb03a0s09a2sdfglkj490333
Cseq: 153 INFO
Server:Conf-serv/3GPP
Session-Expires:240;refresher=uac
Supported:timer,recipient-list-invite
Content-Length: (. . .)

Embodiment 3

Figure 6:
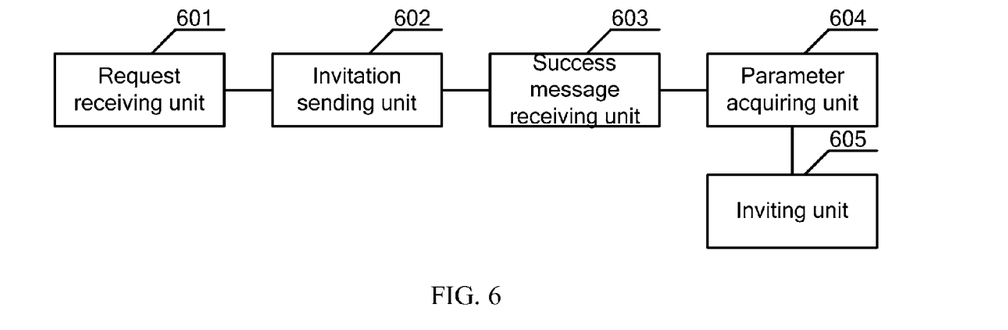

As shown in FIG. 6, this embodiment further provides a gateway. The gateway may be a computer, a processor, or another physical entity. The gateway includes:

a request receiving unit 601, configured to receive, after the gateway attends a first conference, an INVITE request sent by a first application server, where the INVITE request is a request for inviting a second terminal served by a second application server to attend the first conference;

an invitation sending unit 602, configured to send an invitation call to the second application server to request creating a second conference, where the invitation call carries parameters for receiving media that are negotiated with the first conference;

a success message receiving unit 603, configured to receive conference creation success information sent by the second application server;

a parameter acquiring unit 604, configured to acquire, after the conference creation success information sent by the second application server is received, transmission related parameters negotiated, according to the parameters for receiving media that are negotiated with the first conference and carried in the invitation call, with a second media resource server on the side of the second application server; and an inviting unit 605, configured to send an invitation to the second application server to invite the second terminal to attend the second conference.

Figure 7:
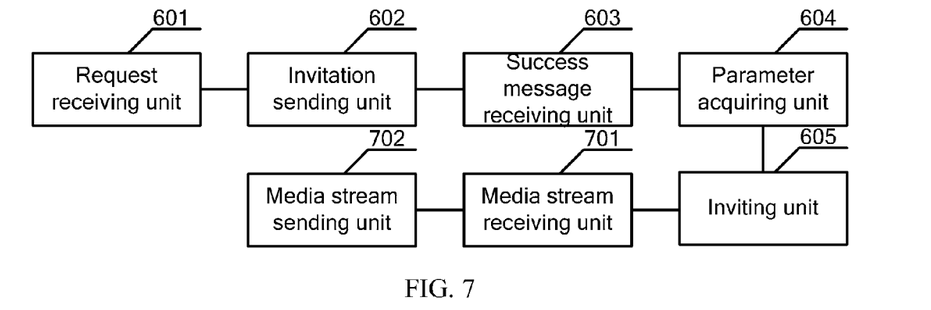

As shown in FIG. 7, the gateway further includes:

a media stream receiving unit 701, configured to receive a first media stream sent by the first application server, and/or receive a second media stream sent by the second application server; and a media stream sending unit 702, configured to forward the first media stream to the second media resource server, and forward the second media stream to a first media resource server.

Figure 8:
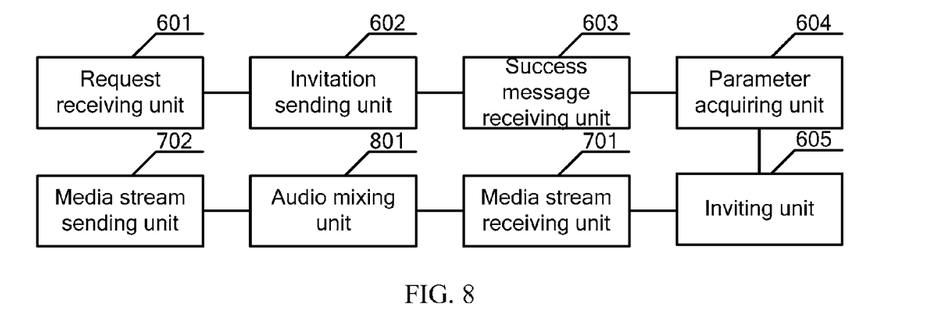

As shown in FIG. 8, the gateway further includes:

an audio mixing unit 801, configured to perform, before the first media stream is forwarded to the second media resource server, audio mixing for the first media stream, and/or perform, before the second media stream is forwarded to the first media resource server, audio mixing for the second media stream; and the media stream sending unit 702, specially configured to send the first media stream that has been performed audio mixing processing to the second media resource server, and send the second media stream that has been performed the audio mixing processing to the first media resource server.

Figure 9:
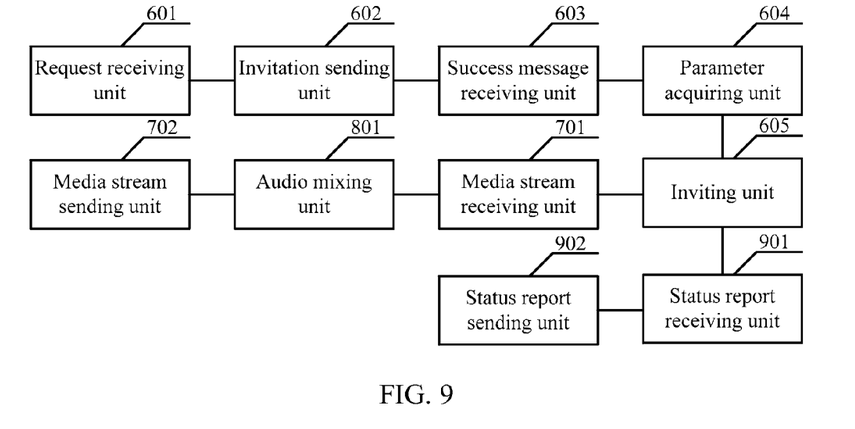

As shown in FIG. 9, the gateway further includes:

a status report receiving unit 901, configured to receive status report information of the second terminal sent by the second application server; and a status report sending unit 902, configured to send the status report information to the first application server.

Figure 10:
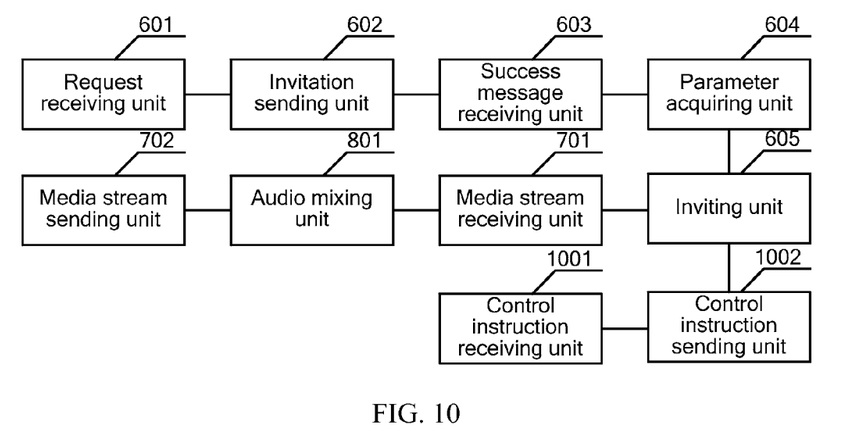

As shown in FIG. 10, the gateway further includes:

a control instruction receiving unit 1001, configured to receive a second conference site control command sent by the first application server, where the second conference site control command carries a conference site control instruction; and a control instruction sending unit 1002, configured to send, according to the conference site control instruction, a message carrying the conference site control instruction to the second application server to request the second application server to control the second conference site according to the conference site control instruction.

Embodiment 4

Figure 11:
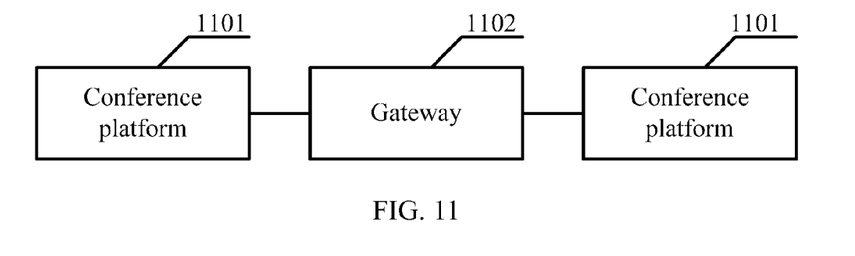

As shown in FIG. 11, this embodiment of the present invention further provides a system for cross-platform conference convergence, which includes two or more conference platforms 1101 on heterogeneous networks and further includes any gateway 1102 in Embodiment 3.

The gateway, serving as a medium of heterogeneous networks, creates conferences, negotiates communication parameters, and implements cascading of voice conferences between two different conference platforms, thereby implementing convergence of heterogeneous networks through conference cascading. The objective of a conference across multiple conference platforms is achieved. Usage of a private line between the enterprise and the operator is eliminated in the entire implementation process. In addition, it is favorable to popularization because only a gateway device is added between heterogeneous networks, and original devices of the operator and the enterprise are reserved, changing the networks slightly.

Persons of ordinary skill in the art should understand that all or part of the steps of the method provided in the embodiments above may be implemented by a program instructing relevant hardware. The program may be stored in a computer readable storage medium. The storage medium may be a read-only memory, a magnetic disk, an optical disk or the like.

The foregoing describes in detail the method, the apparatus, and the system for cross-platform conference convergence provided in the embodiments of the present invention. Specific cases are used for illustrating principles and embodiments of the present invention. The foregoing description about the embodiments is merely for understanding the methods and core ideas of the present invention. Meanwhile, persons of ordinary skill in the art may make modifications to the specific implementation manners and application scopes according to the idea of the present invention. In conclusion, the content of this specification should not be construed as a limitation on the present invention.

What is claimed is:

1. A method for cross-platform conference convergence which is applied to a conference system comprising a gateway device, a first application server (AS), a first media resource server (MRS) on a side of the first AS, a second AS and a second MRS on a side of the second AS, comprising:

receiving, by the gateway device, an INVITE request sent by the first AS after the first AS acknowledging the gateway device has joined a first conference created by the first MRS, wherein the INVITE request is a request for inviting a second terminal to attend the first conference and the second terminal is served by the second AS;

sending, by the gateway device, an invitation call for creating a second conference to the second AS, to enable the second AS to instruct the second MRS to create the second conference, wherein the invitation call comprises parameters that are negotiated by the gateway device with the first MRS and are used for transmitting a media stream between the first MRS and the gateway device; and after the gateway device receives conference creation success information sent by the second AS, sending by the gateway device an invitation to the second AS to invite the second terminal to attend the second conference, and acquiring, by the gateway device, transmission-related parameters from the second MRS through the second AS, wherein the transmission-related parameters are determined by the second MRS according to intersection between the parameters carried in the invitation call and parameters supported by the second MRS and used for transmitting a media stream between the second MRS and the gateway device;

receiving, by the gateway device, a first media stream of the first conference sent by the first MRS, and forwarding the first media stream to the second MRS to play the first media stream to the second terminal that has joined the second conference; and receiving, by the gateway device, a second media stream of the second conference sent by the second MRS, and forwarding the second media stream to the first MRS to play the second media stream to a participant of the first conference.

2. The method according to claim 1, wherein before the forwarding, by the gateway device, the first media stream to the second media resource server, the method further comprises:

performing, by the gateway device, audio mixing processing for the first media stream to obtain a mixed first media stream, when the first media stream comprises more than one media stream;

wherein the forwarding the first media stream to the second media resource server comprises:

sending the mixed first media stream to the second media resource server;

wherein before the forwarding, by the gateway device, the second media stream to the first media resource server, the method further comprises:

performing, by the gateway device, the audio mixing processing for the second media stream to obtain a mixed second media stream, when the second media stream comprises more than one media stream; and wherein the forwarding the second media stream to the first media resource server comprises:

sending the mixed second media stream to the first media resource server.

3. The method according to claim 1, further comprising:

receiving, by the gateway device, status report information of the second terminal sent by the second application server; and sending the status report information to the first application server.

4. The method according to claim 2, further comprising:

receiving, by the gateway device, status report information of the second terminal sent by the second application server; and sending the status report information to the first application server.

5. The method according to claim 1, further comprising:

receiving, by the gateway device, a second conference site control command sent by the first application server, wherein the second conference site control command carries a conference site control instruction; and sending, by the gateway device, according to the conference site control instruction, a message carrying the conference site control instruction to the second application server to request the second application server to control the second conference site according to the conference site control instruction.

6. The method according to claim 2, further comprising:
receiving, by the gateway device, a second conference site control command sent by the first application server, wherein the second conference site control command carries a conference site control instruction; and
sending, by the gateway device, according to the conference site control instruction, a message carrying the conference site control instruction to the second application server to request the second application server to control the second conference site according to the conference site control instruction.

7. A gateway in a conference system which comprises a gateway device, a first application server (AS), a first media resource server (MRS) on a side of the first AS, a second AS and a second MRS on a side of the second AS, comprising:
a request receiving unit, configured to receive, an INVITE request sent by the first AS after the first AS acknowledging the gateway device has joined a first conference created by the first MRS, wherein the INVITE request is a request for inviting a second terminal to attend the first conference and the second terminal is served by the second AS;
an invitation sending unit, configured to send an invitation call for creating a second conference to the second AS, to enable the second AS to instruct the second MRS to create the second conference, wherein the invitation call carries parameters that are negotiated by the gateway device with a first MRS and are used for transmitting a media stream between the first MRS and the gateway device;
a success message receiving unit, configured to receive conference creation success information sent by the second AS;
a parameter acquiring unit, configured to acquire, after the success message receiving unit receives the conference creation success information, transmission-related parameters from the second MRS through the second AS, wherein the transmission-related parameters are determined by the second MRS according to intersection between the parameters carried in the invitation call and parameters supported by the second MRS and used for transmitting a media stream between the second MRS and the gateway device;
an inviting unit, configured to send an invitation to the second AS to invite the second terminal to attend the second conference;
a media stream receiving unit, configured to receive a first media stream of the first conference sent by the first MRS, and receive a second media stream of the second conference sent by the second MRS; and
a media stream sending unit, configured to forward the first media stream to the second MRS to play the first media stream to the second terminal that has joined the second conference, and forward the second media stream to the first MRS to play the second media stream to a participant of the first conference.

8. The gateway according to claim 7, further comprising:
an audio mixing unit, configured to perform, before the first media stream is forwarded to the second media resource server, audio mixing processing for the first media stream to obtain a mixed first media stream, when the first media stream comprises more than one media stream, and perform, before the second media stream is forwarded to the first media resource server, the audio mixing processing for the second media stream to obtain a mixed second media stream, when the second media stream comprises more than one media stream; and
the media stream sending unit, further configured to send the mixed first media stream to the second media resource server, and send the mixed second media stream to the first media resource server.

9. The gateway according to claim 7, further comprising:
a status report receiving unit, configured to receive status report information of the second terminal sent by the second application server; and
a status report sending unit, configured to send the status report information to the first application server.

10. The gateway according to claim 7 further comprising:
a control instruction receiving unit, configured to receive a second conference site control command sent by the first application server, wherein the second conference site control command carries a conference site control instruction; and
a control instruction sending unit, configured to send, according to the conference site control instruction, a message carrying the conference site control instruction to the second application server to request the second application server to control the second conference site according to the conference site control instruction.

11. A system for cross-platform conference convergence, comprising a gateway, a first application server (AS), a first media resource server (MRS) on a side of the first AS, a second AS and a second MRS on a side of the second AS, wherein the gateway comprises:
a request receiving unit, configured to receive, an INVITE request sent by the first AS after the first AS acknowledging the gateway device has joined a first conference created by the first MRS, wherein the INVITE request is a request for inviting a second terminal to attend the first conference and the second terminal is served by the second AS;
an invitation sending unit, configured to send an invitation call for creating a second conference to the second AS, to enable the second AS to instruct the second MRS to create the second conference, wherein the invitation call carries parameters that are negotiated by the gateway device with a first MRS and are used for transmitting a media stream between the first MRS and the gateway device;
a success message receiving unit, configured to receive conference creation success information sent by the second AS;
a parameter acquiring unit, configured to acquire, after the success message receiving unit receives the conference creation success information, transmission-related parameters from the second MRS through the second AS, wherein the transmission-related parameters are determined by the second MRS according to intersection between the parameters carried in the invitation call and parameters sported by the second MRS and used for transmitting a media stream between the second MRS and the gateway device; and
an inviting unit, configured to send an invitation to the second AS to invite the second terminal to attend the second conference;
a media stream receiving unit, configured to receive a first media stream of the first conference sent by the first MRS, and receive a second media stream of the second conference sent by the second MRS; and a media stream sending unit, configured to forward the first media stream to the second MRS to play the first media stream to the second terminal that has joined the second conference, and forward the second media stream to the first MRS to play the second media stream to a participant of the first conference.

12. The gateway according to claim 11, wherein the gateway further comprises:

an audio mixing unit, configured to perform, before the first media stream is forwarded to the second media resource server, audio mixing processing for the first media stream to obtain a mixed first media stream, when the first media stream comprises more than one media stream, and perform, before the second media stream is forwarded to the first media resource server, the audio mixing processing for the second media stream to obtain a mixed second media stream, when the second media stream comprises more than one media stream; and the media stream sending unit, further configured to send the mixed first media stream to the second media resource server, and send the mixed second media stream to the first media resource server.

13. The gateway according to claim 11, wherein the gateway further comprises:

a status report receiving unit, configured to receive status report information of the second terminal sent by the second application server; and a status report sending unit, configured to send the status report information to the first application server.

14. The gateway according to claim 11, wherein the gateway further comprises:

a control instruction receiving unit, configured to receive a second conference site control command sent by the first application server, wherein the second conference site control command carries a conference site control instruction; and a control instruction sending unit, configured to send, according to the conference site control instruction, a message carrying the conference site control instruction to the second application server to request the second application server to control the second conference site according to the conference site control instruction.

\* \* \* \* \*

UNITED STATES PATENT AND TRADEMARK OFFICE
CERTIFICATE OF CORRECTION

PATENT NO. : 9,106,716 B2
APPLICATION NO. : 13/705987
DATED : August 11, 2015
INVENTOR(S) : Zhou et al.

Page 1 of 1

It is certified that error appears in the above-identified patent and that said Letters Patent is hereby corrected as shown below:

In The Specification

Column 22, line 60, "sported by" should read -- supported by --.

Signed and Sealed this
Twelfth Day of January, 2016

Michelle K. Lee
*Director of the United States Patent and Trademark Office*